United States Patent
Yamamoto et al.

(10) Patent No.: US 10,826,116 B2
(45) Date of Patent: Nov. 3, 2020

(54) SOLID ELECTROLYTE AND LITHIUM ION BATTERY WITH CUBIC GARNET TYPE CRYSTALLINE AND AMORPHOUS AREAS

(71) Applicant: SEIKO EPSON CORPORATION, Tokyo (JP)

(72) Inventors: Hitoshi Yamamoto, Chino (JP); Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 28 days.

(21) Appl. No.: 16/083,373

(22) PCT Filed: Mar. 3, 2017

(86) PCT No.: PCT/JP2017/008463
§ 371 (c)(1),
(2) Date: Sep. 7, 2018

(87) PCT Pub. No.: WO2017/154766
PCT Pub. Date: Sep. 14, 2017

(65) Prior Publication Data
US 2019/0097266 A1    Mar. 28, 2019

(30) Foreign Application Priority Data
Mar. 10, 2016 (JP) .................................. 2016-047333

(51) Int. Cl.
*H01M 10/0562* (2010.01)
*H01M 10/0525* (2010.01)
(Continued)

(52) U.S. Cl.
CPC ......... *H01M 10/0562* (2013.01); *C04B 35/01* (2013.01); *C04B 35/486* (2013.01);
(Continued)

(58) Field of Classification Search
CPC ........... H01M 10/052; H01M 10/0562; H01M 10/0525; H01M 10/0585;
(Continued)

(56) References Cited

U.S. PATENT DOCUMENTS

| 2011/0059369 A1 | 3/2011 | Nan et al. | |
| 2012/0237834 A1* | 9/2012 | Ogasa ............... | H01M 10/0562 429/320 |

(Continued)

FOREIGN PATENT DOCUMENTS

| JP | 2003-346895 A | 12/2003 |
| JP | 2009-215130 A | 9/2009 |

(Continued)

OTHER PUBLICATIONS

May 16, 2017 Search Report issued in International Patent Application No. PCT/JP2017/008463.
(Continued)

*Primary Examiner* — Barbara L Gilliam
*Assistant Examiner* — Kwang Han
(74) *Attorney, Agent, or Firm* — Oliff PLC

(57) ABSTRACT

A solid electrolyte which reduces grain boundary resistance and exhibits a high total ion conductivity is provided.
The solid electrolyte includes a first area which has a cubic garnet type crystalline and a second area which is amorphous, around the first area, in which each of the first area and the second area contains a composite oxide represented by formula (1) or (2) as a forming material, and an abundance ratio of metal atoms each having an ionic radius of 78 pm or more gradually increases from the first area to the second area.

$$Li_{7+x}La_{3-x}Zr_2A_xO_{12} \quad (1)$$

[In formula (1), A is at least one selected from the group consisting of Mg, Ca, Sr, and Ba. In addition, x is 0.1 or more and 0.6 or less.]

$$Li_7La_{3-x}Zr_2B_xO_{12} \quad (2)$$

(Continued)

[In formula (2), B is at least one selected from the group consisting of Sc and Y. In addition, x is 0.1 or more and 0.6 or less.]

9 Claims, 3 Drawing Sheets

(51) Int. Cl.
| | | |
|---|---|---|
| *H01M 10/0585* | (2010.01) | |
| *C04B 35/01* | (2006.01) | |
| *H01B 1/08* | (2006.01) | |
| *C04B 35/50* | (2006.01) | |
| *C04B 35/486* | (2006.01) | |
| *C04B 35/632* | (2006.01) | |

(52) U.S. Cl.
CPC .......... *C04B 35/50* (2013.01); *C04B 35/6325* (2013.01); *H01B 1/08* (2013.01); *H01M 10/0525* (2013.01); *H01M 10/0585* (2013.01); *C04B 2235/3203* (2013.01); *C04B 2235/3206* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3227* (2013.01); *C04B 2235/3244* (2013.01); *C04B 2235/3251* (2013.01); *C04B 2235/3294* (2013.01); *C04B 2235/3409* (2013.01); *C04B 2235/764* (2013.01); *C04B 2235/80* (2013.01); *H01M 2300/0068* (2013.01); *H01M 2300/0077* (2013.01); *H01M 2300/0091* (2013.01)

(58) Field of Classification Search
CPC . H01M 2300/0068; H01M 2300/0077; H01M 2300/0091; C04B 35/01; C04B 35/6325; C04B 35/486; C04B 35/50; C04B 2235/764; C04B 2235/3227; C04B 2235/3224; C04B 2235/3203; C04B 2235/3225; C04B 2235/3215; C04B 2235/3294; C04B 2235/3251; C04B 2235/80; C04B 2235/3213; C04B 2235/3206; C04B 2235/3409; C04B 2235/3208; C04B 2235/3244

See application file for complete search history.

(56) References Cited

U.S. PATENT DOCUMENTS

| | | | |
|---|---|---|---|
| 2015/0056519 A1* | 2/2015 | Ohta | ................ H01M 10/0562 |
| | | | 429/320 |
| 2015/0099190 A1* | 4/2015 | Holme | .............. C04B 35/62218 |
| | | | 429/322 |

FOREIGN PATENT DOCUMENTS

| | | |
|---|---|---|
| JP | 2011-529243 A | 12/2011 |
| JP | 2013-032259 A | 2/2013 |
| JP | 2013-037992 A | 2/2013 |
| JP | 2013-149493 A | 8/2013 |
| JP | 2013-184848 A | 9/2013 |
| JP | 2013-256435 A | 12/2013 |
| JP | 2015-041573 A | 3/2015 |

OTHER PUBLICATIONS

Tong et al. "Highly Conductive Li Garnets by a Multielement Doping Strategy." Inorganic Chemistry. American Chemistry Society, vol. 54, pp. 3600-3607, 2015.

Kia Tong et al., "Highly Conductive Li Garnets by a Multielement Doping Strategy," Inorganic Chemistry, 2015, vol. 54, No. 7, pp. 3600-3607.

* cited by examiner

SOLID ELECTROLYTE AND LITHIUM ION BATTERY WITH CUBIC GARNET TYPE CRYSTALLINE AND AMORPHOUS AREAS

TECHNICAL FIELD

The present invention relates to a solid electrolyte and a lithium ion battery.

BACKGROUND ART

Lithium ion batteries (including a primary battery and a secondary battery) are used as a power source of many electric appliances including a portable information device. Among the lithium ion batteries, as a lithium ion battery in which a high energy density and safety are compatible, an all-solid lithium battery in which a solid electrolyte is used for conducting lithium ions between positive electrodes and negative electrodes is proposed (for example, see PTL 1).

The solid electrolyte is capable of conducting lithium ions without using an organic electrolytic solution, and leakage of the electrolytic solution or volatilization of the electrolytic solution due to heat generated by driving do not occur. Thus, the solid electrolyte has attracted attention as a material having high safety.

As a solid electrolyte used for such an all-solid lithium battery, an oxide type solid electrolyte which has high lithium ion conductivity, excellent insulating property, and high chemical stability is widely known.

In a case where such a solid electrolyte is in a particulate form (hereinafter, referred to as solid electrolyte particles, in some cases), these solid electrolytes are molded to have a desired shape by compression molding, in many cases. However, since the solid electrolyte particles are very hard, contact between the solid electrolyte particles may be insufficient in an obtained molded product. Accordingly, grain boundary resistance of the solid electrolyte particles increases, and the lithium ion conductivity tends to be low.

Therefore, as a method of reducing such grain boundary resistance and forming a solid electrolyte exhibiting a high total ion conductivity, a method of sintering at high temperature after coating a surface of the solid electrolyte particle with $SiO_2$ is proposed (PTL 2).

CITATION LIST

Patent Literature

PTL 1: JP-A-2009-215130
PTL 2: JP-T-2011-529243

SUMMARY OF INVENTION

Technical Problem

However, in the method described in PTL 2, it is difficult to coat the entire surface of the solid electrolyte particle with $SiO_2$. In addition, there is a possibility that a composition of the solid electrolyte changes due to volatilization of lithium during sintering at the high temperature or occurrence of a side reaction.

Further, when the sintering temperature is raised in order to lower the grain boundary resistance, there is a possibility that a large amount of by-products are formed. On the other hand, when the sintering temperature is lowered in order to reduce the formation of by-products, there is possibility that the solid electrolyte particles do not sinter with each other and the grain boundary resistance increases.

An aspect of the present invention is made in view of such circumstances, and an object thereof is to provide a solid electrolyte which reduces the grain boundary resistance and exhibits a high total ion conductivity. In addition, an object of another aspect of the present invention is to provide a method of manufacturing a solid electrolyte for obtaining a solid electrolyte exhibiting a high total ion conductivity. Further, an object of still another aspect of the invention is to provide a lithium ion battery having such a solid electrolyte.

Solution to Problem

In order to solve the above problems, an aspect of the present invention provides a solid electrolyte including: a plurality of first areas which has a cubic garnet type crystalline; and a second area which is amorphous around the plurality of first areas, in which the plurality of first areas and the second area contain a composite oxide represented by formula (1) or (2) as the same forming material, the second area further contains metal atoms each having an ionic radius of 78 pm or more, and in a grain boundary between the plurality of first areas and the second area, an abundance ratio of the metal atoms gradually increases from the plurality of first areas to the second area.

$$Li_{7+x}La_{3-x}Zr_2A_xO_{12} \qquad (1)$$

[In formula (1), A represents at least one selected from the group consisting of magnesium, calcium, strontium, and barium. In addition, x is 0.1 or more and 0.6 or less.]

$$Li_7La_{3-x}Zr_2B_xO_{12} \qquad (2)$$

[In formula (2), B represents at least one selected from the group consisting of scandium and yttrium. In addition, x is 0.1 or more and 0.6 or less.]

According to this configuration, since the plurality of first areas are formed of the composite oxides represented by formula (1) or (2), the plurality of first areas tend to have the cubic garnet type crystalline exhibiting high bulk ion conductivity. In addition, the plurality of first areas using these composite oxides can be expected that further higher bulk ion conductivity is obtained among the garnet type solid electrolytes.

On the other hand, although the second area contains the same forming materials as the plurality of first areas, since a large amount of metal atoms each having an ionic radius of 78 pm or more are contained, the second area becomes to have an amorphous phase having a component similar to the first areas. That is, the second area has an amorphous phase of the composite oxides represented by formula (1) or (2), thereby having the ion conductivity.

In the solid electrolyte which is known in the related art and uses the solid electrolyte particles, since the contact area between the solid electrolyte particles is small, the grain boundary resistance increases and the ion conductivity tends to be low. On the contrary, in the solid electrolyte of the present invention, in addition to contacting the first areas with each other, the first areas can be connected to each other via the amorphous second area having ion conductivity. Accordingly, the grain boundary resistance can be reduced compared to a case of contacting only the first areas with each other, thereby increasing the ion conductivity.

In addition, even in a case where the first areas do not contact with each other, the first areas can be connected to each other via the amorphous second area having ion conductivity, thereby being possible to conduct ions.

Further, in boundaries between the plurality of first areas and the second area, an abundance ratio of metal atoms each having an ionic radius of 78 pm or more gradually increases from the plurality of first areas to the second area. Accordingly, a crystalline phase continuously changes from the first areas having a crystalline phase to the second area having an amorphous phase. Therefore, the first area and the second area are smoothly connected to each other. As a result, the grain boundary resistance between the plurality of first areas and the second area is reduced and the ion conductivity increases.

According to the above effect, a solid electrolyte which reduces grain boundary resistance and exhibits a high total ion conductivity can be obtained.

In the aspect of the present invention, a configuration that a composite containing the plurality of first areas and the second area has a plurality of voids, a third area which is amorphous is formed in the plurality of voids, and the third area contains an element different from the second area may be adopted.

According to this configuration, since the third area is formed in the voids between the first area and the second area, it is possible to conduct ions via the amorphous third area. Accordingly, a solid electrolyte exhibiting a high total ion conductivity can be obtained.

In the aspect of the present invention, a configuration that the metal atoms are any one of niobium, antimony, and tantalum may be adopted.

According to this configuration, the plurality of first areas tend to have the cubic garnet type crystalline and the second area tends to be amorphous. In addition, since the boundaries between the plurality of first areas and the second area tend to be unclear, the grain boundary resistance between the plurality of first areas and the second area is reduced and the ion conductivity increases.

In the aspect of the present invention, the third area may be configured to contain at least lithium, boron, and oxygen as elements.

According to this configuration, since the amorphous third area also exhibits the ion conductivity, a solid electrolyte exhibiting a high total ion conductivity can be obtained.

In the aspect of the present invention, the third area may be configured to contain lithium borate as a forming material.

According to this configuration, by using a material known in the related art as the solid electrolyte of the lithium ion battery, the amorphous third area can also exhibit the ion conductivity and a solid electrolyte exhibiting a high total ion conductivity can be obtained.

Another aspect of the invention provides a method of manufacturing a solid electrolyte, the method including: a first step of removing a solvent from a solution in which a compound containing a lithium compound, a lanthanum compound, a zirconium compound, and a predetermined element and a compound containing metal atoms each having an ionic radius of 78 pm or more are dissolved, to gel; a second step of heat-treating the obtained gel to form a composite containing a plurality of first areas and a second area; a third step of filling a plurality of voids of the composite with a melt of a compound containing at least lithium, boron, and oxygen as elements; and a fourth step of cooling the melt to form a third area, in which a predetermined element is at least one selected from the group consisting of magnesium, calcium, strontium, barium, scandium, and yttrium.

According to this method, lithium, lanthanum, zirconium, and the predetermined element which are contained in the gel form a plurality of first areas which have the cubic garnet type crystalline. At this time, the first area tends to have the cubic garnet type crystalline in which a part of lanthanum is substituted with a predetermined element. The garnet type crystalline containing such a predetermined element is generated at a low temperature compared to a garnet type crystalline not containing a predetermined element. Therefore, a forming temperature of the solid electrolyte can be lowered compared to the garnet type solid electrolyte known in the related art. Accordingly, formation of a by-products can be reduced in the plurality of first areas, thereby being possible to expect the high ion conductivity.

In addition, the metal atoms contained in the gel, each having the ionic radius of 78 pm or more are hardly substituted with the metal element forming the above garnet type crystalline. Therefore, the metal atoms each having an ionic radius of 78 pm or more are excluded from the plurality of first areas in which the garnet type crystalline is formed. Accordingly, in the first areas, the solid electrolyte having the garnet type crystalline, which is excellent in crystallinity and has high ion conductivity is obtained. On the other hand, since the abundance ratio of metal atoms each having an ionic radius of 78 pm or more increases around the plurality of first areas, even in a case of containing the same forming material as the garnet type crystalline, the amorphous tends to be obtained. Therefore, the second area disposed around the plurality of first areas tends to be amorphous.

In addition, a structure in which the abundance ratio of the metal atoms each having an ionic radius of 78 pm or more gradually increases from the plurality of first areas to the second area can be adopted. Accordingly, since the boundaries between the plurality of first areas and the second area become unclear, the grain boundary resistance between the plurality of first areas and the second area is reduced and the ion conductivity increases.

Further, the amorphous third area is formed by at least lithium, boron, and oxygen which are contained in the melt. Since such elements are contained, the amorphous third area can also exhibit the ion conductivity. The above composite can be connected to each other via the amorphous third area, thereby being possible to conduct ions.

According to the above effect, a method of manufacturing a solid electrolyte, by which a solid electrolyte exhibiting high total ion conductivity is obtained, is obtained.

Still another aspect of the invention provides a lithium ion battery including: a positive electrode; a negative electrode; and a solid electrolyte layer which is sandwiched between the positive electrode and the negative electrode, in which the solid electrolyte layer contains the above solid electrolyte.

According to this configuration, a lithium ion battery which has high total ion conductivity of a solid electrolyte layer, high output response, and high capacity density, can be obtained.

DESCRIPTION OF EMBODIMENTS

[Lithium Ion Battery]

Hereinafter, a lithium ion battery according to the present embodiment will be described with reference to FIG. 1. In all the following drawings, in order to view the drawings easily, dimensions, ratios, or the like of respective constituent elements are suitably made different.

Figure 1:
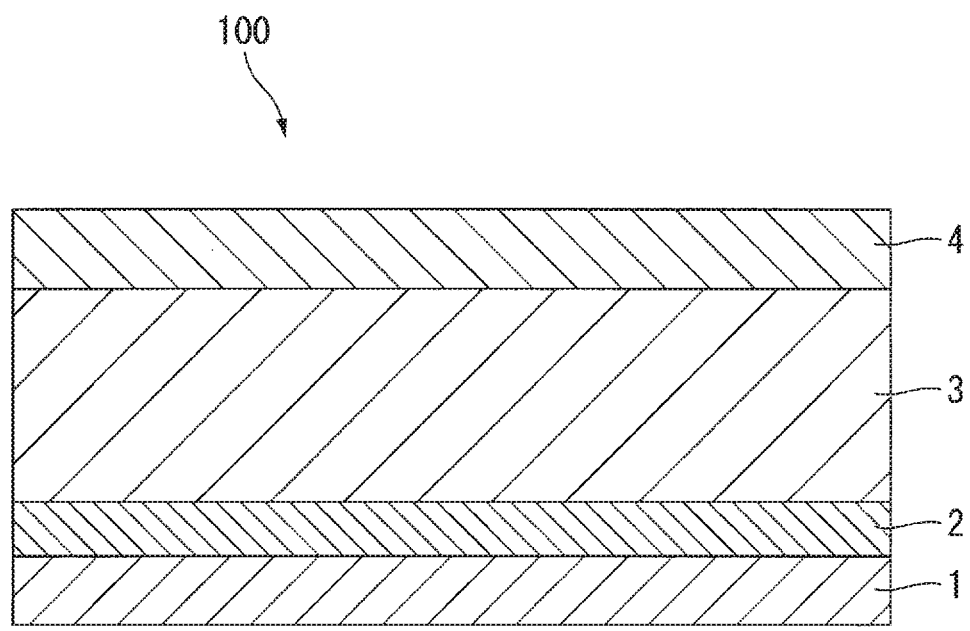
FIG. 1 is a sectional diagram schematically showing a lithium ion battery according to the present embodiment.

FIG. 1 is a sectional diagram schematically showing the lithium ion battery according to the present embodiment. A lithium ion battery 100 shown in FIG. 1 has a configuration in which a current collector 1, an active material layer 2, a solid electrolyte layer 3, and an electrode 4 are stacked in this order. That is, the solid electrolyte layer 3 is sandwiched between the electrode 4 and a combination of the current collector 1 and the active material layer 2. The solid electrolyte layer 3 uses a solid electrolyte to be described later as a forming material.

Examples of the forming material of the current collector 1 include one kind of metal (metal simple substance) selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd) and an alloy containing two or more kinds of metal elements selected from the group consisting thereof.

As a shape of the current collector 1, a plate shape, a foil shape, a net shape, and the like can be adopted. A surface of the current collector 1 may be smooth and may be formed to be uneven.

The active material layer 2 has different forming materials respectively in a case where the current collector 1 is used for a positive electrode side and a case where the current collector 1 is used for a negative electrode side, in the lithium ion battery 100.

In a case where the current collector 1 is used for the positive electrode side, as the forming material of the active material layer 2, a material commonly known as a positive electrode active material can be used. Examples of such a material include lithium composite oxide.

Examples of lithium composite oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$, ore the like. In addition, a solid solution in which a part of atoms in crystals of these lithium composite oxides is substituted with another transition metal, typical metal, alkali metal, alkali rare earth, lanthanoid, chalcogenide, halogen, or the like can also be used as the positive electrode active material.

In a case where the current collector 1 is used for the negative electrode side, as the forming material of the active material layer 2, a material commonly known as a negative electrode active material can be used.

Examples of the negative electrode active material include a silicon-manganese alloy (Si—Mn), silicon-cobalt alloy (Si—Co), silicon-nickel alloy (Si—Ni), niobium pentoxide ($Nb_2O_5$), vanadium pentoxide ($V_2O_5$), titanium oxide ($TiO_2$), indium oxide ($In_2O_3$), zinc oxide (ZnO), tin oxide ($SnO_2$), nickel oxide (NiO), indium oxide (ITO) doped with tin (Sn), zinc oxide (AZO) doped with aluminum (Al), zinc oxide (GZO) doped with gallium (Ga), tin oxide (ATO) doped with antimony (Sb), tin oxide (FTO) doped with fluorine (F), a carbon material, a material in which lithium ions are intercalated between layers of a carbon material, an anatase phase of $TiO_2$, lithium composite oxides such as $Li_4Ti_5O_{12}$ and $Li_2Ti_3O_7$, and Li metal, or the like.

In a case where the current collector 1 is used for the positive electrode side, the electrode 4 is a negative electrode. In this case, aluminum can be selected as a forming material of the current collector 1, and lithium can be selected as a forming material of the electrode 4. The combination of the current collector 1 and the active material layer 2 corresponds to the positive electrode in the aspects of the present invention. The electrode 4 corresponds to the negative electrode in the aspects of the present invention.

Such a lithium ion battery 100 can be manufactured as follows.

First, the current collector 1 in which the active material layer 2 is formed on a surface thereof is prepared. Next, the solid electrolyte layer 3 excellent in the lithium ion conductivity is formed on a surface of the active material layer 2.

Further, the electrode 4 is formed on a surface of the solid electrolyte layer 3. Accordingly, the lithium ion battery 100 can be easily manufactured.

As a method of manufacturing the lithium ion battery 100, in addition to this, a member in which a solid electrolyte layer is formed on a surface of the active material layer 2 and a member in which a solid electrolyte layer is formed on the surface of the electrode 4 are separately manufactured, and then the solid electrolyte layers of respective members may be bonded to each other.

[Solid Electrolyte]

Next, a solid electrolyte and a method of manufacturing a solid electrolyte according to the present embodiment will be described with reference to FIGS. 2 and 3. The total ion conductivity in the present specification means the sum of the bulk ion conductivity and the ion conductivity.

Figure 2:
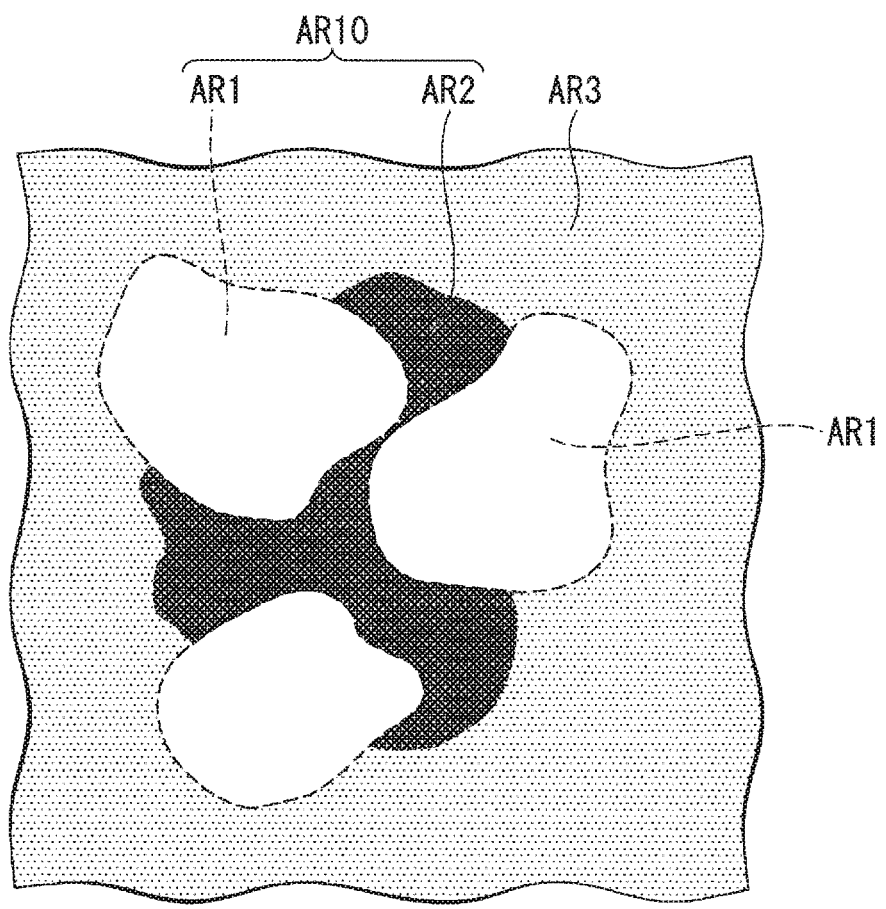
FIG. 2 is a schematic diagram of a solid electrolyte according to the present embodiment.

FIG. 2 is a schematic diagram of the solid electrolyte according to the present embodiment and is a sectional diagram of the solid electrolyte at a predetermined position. As shown in FIG. 2, the solid electrolyte of the present embodiment includes a plurality of first areas AR1 which has a cubic garnet type crystalline and a second area AR2 which is amorphous and disposed around the plurality of first areas AR1. A combination of the plurality of first areas AR1 and the second AR2 is referred to as a composite AR10.

The plurality of first areas AR1 and the second area AR2 contain a composite oxide represented by formula (1) or (2) as the same forming material. Here, in formula (1), A represents at least one selected from the group consisting of magnesium (Mg), calcium (Ca), strontium (Sr), and barium (Ba). In addition, in formula (2), B represents at least one selected from the group consisting of scandium (Sc) and yttrium (Y).

$$Li_{7+x}La_{3-x}Zr_2A_xO_{12} \quad (1)$$

(In formula (1), x is 0.1 or more and 0.6 or less.)

$$Li_7La_{3-x}Zr_2B_xO_{12} \quad (2)$$

(In formula (2), x is 0.1 or more and 0.6 or less.)

In the solid electrolyte of the present embodiment, since the plurality of first areas AR1 are formed of the composite oxides represented by formula (1) or (2), the plurality of first areas AR1 tend to have the cubic garnet type crystalline exhibiting high bulk ion conductivity.

The second area AR2 contains the same forming materials as the plurality of first areas; however, since a large amount of metal atoms each having an ionic radius of 78 pm or more are contained, the second area AR2 becomes to have an amorphous phase rather than the crystalline structure. In addition, the second area has an amorphous of the composite oxide represented by formula (1) or (2), thereby having the ion conductivity.

The metal atoms have an ionic radius of 78 pm or more. Thus, the metal atoms each having an ionic radius of 78 pm or more can be distributed in the amorphous second area AR2 more suitably than in the crystalline first area AR1. When the ionic radius is less than 78 pm, the metal atom is easy to be substituted with the metal element forming the garnet type crystalline. Therefore, in the first areas AR1, there is a possibility that the solid electrolyte having the garnet type crystalline, which is excellent in crystallinity and has high ion conductivity is not obtained.

A state in which the metal atoms each having an ionic radius of 78 pm or more are distributed can be confirmed by detecting a section of the solid electrolyte using an X-ray diffraction (XRD) method and analyzing the obtained image.

In the solid electrolyte which is known in the related art and uses the solid electrolyte particles, since the contact area between the solid electrolyte particles is small, although the solid electrolyte particles themselves have the high ion conductivity, the grain boundary resistance increases and the ion conductivity tends to be low. On the contrary, in the solid electrolyte of the present invention, in addition to contacting the first areas with each other, crystalline particles of the first areas can be connected to each other via the amorphous second area having ion conductivity. Accordingly, an ion conduction path between the crystalline particles becomes thicker compared to a case of contacting only the first areas to each other, thereby being possible to reduce the grain boundary resistance. As a result, the ion conductivity of the entire solid electrolyte increases.

In addition, even in a portion where the first areas do not directly contact with each other, as long as the first areas are joined via the amorphous second area, the first areas can be connected to each other via the amorphous second area having ion conductivity. Accordingly, the ion conduction path between the first areas increases, thereby improving the ion conductivity of the entire solid electrolyte.

Further, in boundaries between the plurality of first areas and the second area, an abundance ratio of metal atoms each having an ionic radius of 78 pm or more gradually increases from the plurality of first areas to the second area. In boundaries between the first areas and the second area, on a plurality of first areas AR1 sides, there are few metal atoms each having an ionic radius of 78 pm or more, thereby containing a large amount of cubic garnet type crystalline. On the other hand, on a second area AR2 side, since metal atoms each having an ionic radius of 78 pm or more relatively increases, it is difficult to form the garnet type crystalline and a large amount of amorphous are contained therein. Thus, the boundary between the first area and the second area becomes an area which continuously changes from a crystalline form containing a large amount of crystalline to a crystalline form containing a large amount of amorphous. The boundary between the first area and the second area becomes unclear. According to such a configuration, the plurality of first areas and the second area are smoothly connected to each other, thereby reducing the grain boundary resistance between the areas and increasing the ion conductivity.

The metal atoms each having an ionic radius of 78 pm or more are preferably any one of niobium (Nb), antimony (Sb), and tantalum (Ta). Using these metals, the plurality of first areas AR1 tend to have the cubic garnet type crystalline and the second area AR2 tends to be amorphous. In addition, since the boundaries between the plurality of first areas and the second area tend to be unclear, the grain boundary resistance between the plurality of first areas and the second area is reduced and the ion conductivity increases.

The composite AR10 formed of the first areas AR1 and the second area AR2 has a plurality of voids by volume shrinkage during manufacturing. In the solid electrolyte of the present embodiment, it is preferable that the plurality of voids are filled with the third area AR3 which is amorphous. The third area preferably contains an element different from the second area. Accordingly, even in a void portion of the composite AR10, it is possible to conduct ions via the amorphous third area AR3. Accordingly, a solid electrolyte exhibiting a high total ion conductivity can be obtained.

The third area preferably contains at least lithium (Li), boron (B), and oxygen (O) as elements. Accordingly, the amorphous third area AR3 also exhibits the ion conductivity, thereby being possible to obtain a solid electrolyte exhibiting a high total ion conductivity.

The third area AR3 is preferably formed of a material generally known as a solid electrolyte of a lithium ion battery. The forming material may be at least one selected from the group consisting of lithium borate (LBO) and a material obtained by doping carbon thereto (LOBO). In this manner, by using a material known as the solid electrolyte of the lithium ion battery, the amorphous third area can be formed inexpensively and easily.

[Method of Manufacturing Solid Electrolyte]

Figure 3:
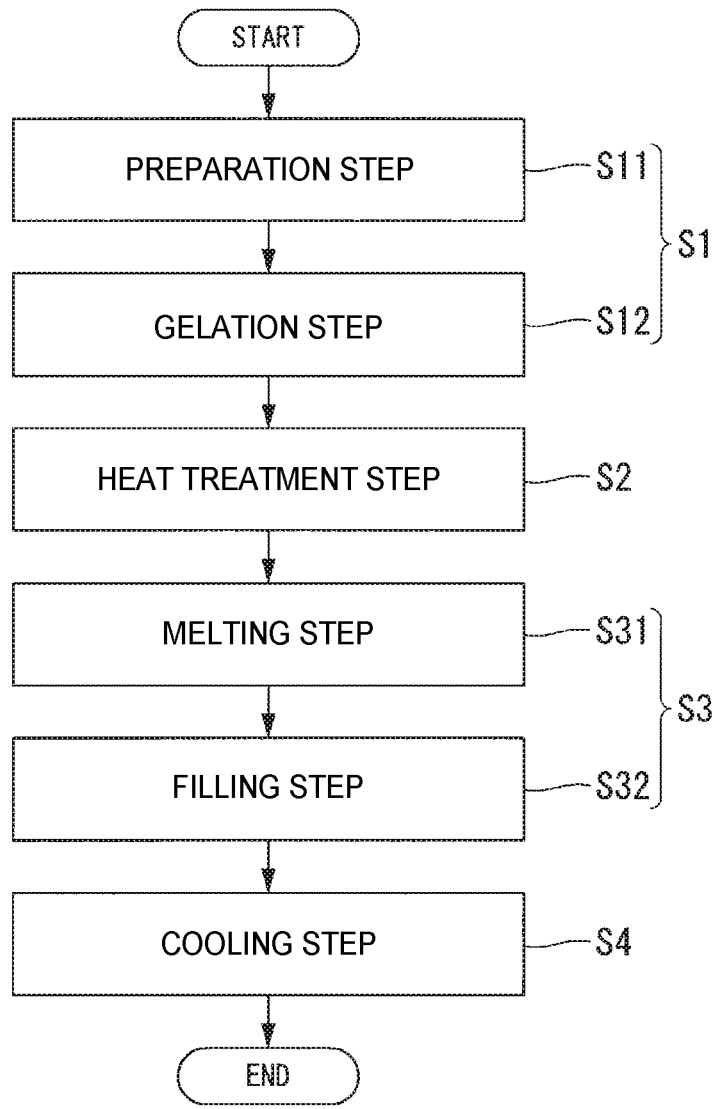
FIG. 3 is a flow chart showing a method of manufacturing a solid electrolyte according to the present embodiment.

FIG. 3 is a flow chart showing a method of manufacturing a solid electrolyte according to the present embodiment. Hereinafter, descriptions will be made with reference to FIG. 3 together and using reference numerals shown in FIG. 3.

As shown in FIG. 3, the method of manufacturing the solid electrolyte according to the present embodiment includes a first step S1, a second step S2, a third step S3, and a fourth step S4.

[First Step]

The first step S1 includes a preparation step S11 of preparing a solution containing a precursor of the composite and a gelation step S12 of gelling the obtained solution. Hereinafter, the solution containing the precursor of the composite may be referred to as a precursor solution in some cases.

In the preparation step S11, the precursor solution is prepared. Specifically, the precursor solution is prepared by dissolving a compound containing a lithium compound, a lanthanum compound, a zirconium compound, and a compound containing a predetermined element and a compound containing metal atoms each having an ionic radius of 78 pm or more in a solvent.

Hereinafter, description will be made using yttrium as an example of the predetermined element. In addition, description will be made using tantalum as an example of the metal atom having an ionic radius of 78 pm or more.

Examples of the lithium compound include an inorganic salt, an organic acid salt, an organolithium compound, and lithium alkoxide, or the like.

Specific examples of the inorganic salt include lithium hydroxide (LiOH), lithium fluoride (LiF), lithium bromide (LiBr), lithium chloride (LiCl), lithium nitrate ($LiNO_3$), and lithium sulfate ($Li_2SO_4$), or the like.

Specific examples of the organic acid salt include lithium formate (LiHCOO), lithium acetate ($LiCH_3COO$), $LiC_2H_3O_3$, lithium citrate ($Li_3C_6H_5O_7$), $LiC_7H_5O_2$, and $LiC_{18}H_{35}O_2$, or the like.

Specific examples of the organolithium compound include methyllithium ($CH_3Li$), butyllithium ($LiC_4H_9$), and phenyllithium ($C_6H_5Li$), or the like.

Specific examples of the lithium alkoxide include lithium methoxide ($LiOCH_3$), lithium ethoxide ($LiOC_2H_5$), lithium propoxide ($LiOC_3H_7$), and lithium butoxide ($LiOC_4H_9$), or the like.

The alkoxy group forming the lithium alkoxide may be linear or branched.

Examples of the lanthanum compound include an inorganic salt, an organic acid salt, an organic lanthanum compound, a complex, and metal alkoxide, or the like. As anions forming the inorganic salt and the organic acid salt, organic groups forming the organic lanthanum compound, and alkoxy groups forming the metal alkoxide, the same ones as those exemplified in the lithium compound can be used.

As a ligand forming the complex, β-diketone such as 2,4-pentanedione can be used.

Examples of the zirconium compound include an inorganic salt, an organic acid salt, an organozirconium compound, a complex, and metal alkoxide, or the like. As anions forming the inorganic salt and the organic acid salt, organic groups forming the organozirconium compound, and alkoxy groups forming the metal alkoxide, the same ones as those exemplified in the lithium compound can be used.

As a ligand forming the complex, β-diketone such as 2,4-pentanedione can be used.

Examples of the yttrium compound include an inorganic salt, an organic acid salt, an organoyttrium compound, a complex, and metal alkoxide, or the like. As anions forming the inorganic salt and the organic acid salt, organic groups forming the organoyttrium compound, and alkoxy groups forming the metal alkoxide, the same ones as those exemplified in the lithium compound can be used.

As a ligand forming the complex, β-diketone such as 2,4-pentanedione can be used.

Examples of the tantalum compound can include an inorganic salt, an organic acid salt, an organic tantalum compound, a complex, and metal alkoxide, or the like. As anions forming the inorganic salt and the organic acid salt, organic groups forming the organic tantalum compound, and alkoxy groups forming the metal alkoxide, the same ones as those exemplified in the lithium compound can be used.

As a ligand forming the complex, β-diketone such as 2,4-pentanedione can be used.

Examples of the solvent used for the precursor solution include a polar solvent capable of dissolving the above compounds. Examples of such the polar solvent include alcohols such as n-butanol, ethanol, and 2-n-butoxyethanol and organic acids such as propionic acid and 2-ethylhexanoic acid.

Next, in the gelation step S12, the solvent is removed from the precursor solution obtained in the preparation step S11 to gel. As a specific example of the gelation step S12, for example, the precursor solution is heated to 140° C. and kept for 1 hour at 140° C., thereby obtaining transparent gel.

The gelation step S12 may be performed continuously with a heat treatment step shown in the second step S2.

[Second Step]

The second step S2 includes the heat treatment step of heat-treating the gel obtained in the first step S1. The obtained gel is heat-treated, thereby being possible to form a composite containing a plurality of first areas and a second area.

A heat treatment temperature in the second step S2 is preferably 500° C. or higher and 1000° C. or lower. A specific example of the second step S2, for example, the heat-treatment is performed by heating the obtained gel at 900° C. in the atmosphere.

By heat-treating the gel, lithium, lanthanum, zirconium, and yttrium which are contained in the gel form a plurality of first areas which have the cubic garnet type crystalline. At this time, when a part of lanthanum is substituted with yttrium, the cubic garnet type crystalline form becomes stable. Therefore, it is possible to generate crystals at a lower temperature compared to a case of the garnet type crystalline not containing yttrium. Therefore, a forming temperature of the solid electrolyte can be lowered compared to the garnet type solid electrolyte known in the related art. Even when a predetermined element other than yttrium is added, the same effect that the cubic garnet type crystalline form is stabilized is obtained. Accordingly, formation of a by-products can be reduced in the plurality of first areas, thereby being possible to expect the high ion conductivity.

In addition, the tantalum contained in the gel is an element which is inherently difficult to be substituted, although a part thereof is substituted with the metal element forming the above garnet type crystalline. Most of the tantalum is excluded from the crystalline first area in a process of forming the garnet type crystalline. On the other hand, since the abundance ratio of the tantalum increases around the plurality of first areas, even in a case of containing the same forming material as the garnet type crystalline, the amorphous structure tends to be obtained. Therefore, the second area disposed around the plurality of first areas tends to be amorphous.

In addition, since the tantalum is discharged to the outside of the crystalline in the process of forming the crystalline of the first area, the tantalum is in the first area in a small amount and is distributed to gradually increase from the first area to the second area. Accordingly, in an area in which the amount of the tantalum is relatively small, the amount of the crystal phase is relatively large and as the tantalum increases, the amount of the amorphous phase relatively increases. Thus, the boundaries between the plurality of the first areas and the second area become unclear. As a result, the first area and the second area are smoothly connected to each other at the boundary in which the crystalline form continuously changes, thereby reducing the grain boundary resistance between the plurality of first areas and the second area and increasing the ion conductivity.

The description was made using tantalum as an example of the metal atom having an ionic radius of 78 pm or more, but other metal atoms other than the tantalum may be used. In this case, examples of a compound including the metal atom having an ionic radius of 78 pm or more can include an inorganic salt, an organic acid salt, an organic metal compound, a complex, and metal alkoxide, or the like. As anions forming the inorganic salt and the organic acid salt, organic groups forming the organic metal compound, and alkoxy groups forming the metal alkoxide, the same ones as those exemplified in the lithium compound can be used.

As a ligand forming the complex, β-diketone such as 2,4-pentanedione can be used.

[Third Step]

The third step S3 includes a melting step S31 of preparing a melt containing the amorphous of the third area as a forming material and a filling step S32 of filling voids in the composite with the obtained melt.

In the melting step S31, the melt containing the amorphous of the third area as a forming material is prepared. As a specific example of the melting step S31, for example, the amorphous of the third area is heated and melted at a temperature equal to or higher than a melting point, thereby preparing the melt.

Next, in the filling step S32, the voids in the composite are filled with the melt obtained in the melting step S31.

The filling method with melt is not particularly limited, and a method known in the related art can be applied. As such a method, for example, filling may be performed by immersing the composite in a melt. In addition, a melt may flow into the voids of the composite, by bringing an end portion of the composite into the melt to impregnate the melt in the voids using a capillary phenomenon.

[Fourth Step]

The fourth step S4 includes a cooling step of cooling the melt with which filling has been performed in the third step S3. The melt with which filling has been performed is cooled and solidified, thereby forming the third area in the voids of the composite. As a specific example of the fourth step S4, for example, the melt is rapidly cooled to a temperature equal to or lower than a melting point of the amorphous.

By cooling the melt, lithium, boron, and oxygen which are at least contained in the melt form the third area formed of amorphous lithium borate. Since such elements are contained, the amorphous third area can also exhibit the ion conductivity. The above composite can be connected to each other via the amorphous third area, thereby being possible to conduct ions.

In this manner, the solid electrolyte of the present embodiment can be obtained, and as another manufacturing method, the following method can be exemplified.

For example, in the first step, a mixture obtained by uniformly mixing a lithium compound, a lanthanum compound, a zirconium compound, an yttrium compound, and a tantalum compound may be heat-treated. At this time, among the above compounds, a compound which is solid at a room temperature can be used as respective compounds. In addition, a mixing method is preferably a method capable of easily mixing these compounds uniformly. For example, it is preferable to perform wet type mixing and pulverizing in a solvent. As such a solvent, a solvent in which each compound is difficult to dissolve is preferable. For example, an organic solvent such as hexane is more preferable. After mixing, the solvent is reduced from the mixture to perform a heat treatment, thereby forming a composite formed of a plurality of first areas and a second area.

According to the solid electrolyte having the configuration as above, it is possible to provide a solid electrolyte which reduces grain boundary resistance and exhibits a high total ion conductivity.

In addition, according to the method of manufacturing the solid electrolyte having the configuration as above, it is possible to easily manufacture the solid electrolyte exhibiting a high total ion conductivity.

Further, according to the lithium ion battery having the configuration as above, a lithium ion battery which has high total ion conductivity of a solid electrolyte layer, high output response, and high capacity density, can be obtained.

Examples of a preferred embodiment according to the present invention has been described above with reference to the attached drawings, but it is needless to say that the present invention is not limited to the examples. Various shapes and combinations of the configuration members shown in the above examples are merely examples, and various modifications can be made based on design requirements or the like within a range without departing from the gist of the present invention.

In the embodiment, description was made using the solid electrolyte of the present invention as a forming material of a solid electrolyte layer of a lithium ion battery. However, the present invention is not limited thereto. For example, the solid electrolyte of the present invention can also be used as a forming material of the solid electrolyte layer of a lithium air battery.

The entire disclosure of Japanese Patent Application No. 2016-047333, filed Mar. 10, 2016 is expressly incorporated by reference herein.

REFERENCE SIGNS LIST

1 . . . current collector
2 . . . active material layer
3 . . . solid electrolyte layer
4 . . . electrode
100 . . . lithium ion battery
AR1 . . . plurality of first areas
AR2 . . . second area
AR3 . . . third area
AR10 . . . composite

The invention claimed is:

1. A solid electrolyte comprising: a first area which has a cubic garnet type crystalline structure; and a second area which is amorphous around the first area, wherein:
    each of the first area and the second area contains a complex oxide represented by formula (1) or (2) as a forming material;

$$Li_{7+x}La_{3-x}Zr_2A_xO_{12} \qquad (1)$$

in formula (1), A is at least one selected from the group consisting of magnesium, calcium, strontium, and barium, and x is 0.1 or more and 0.6 or less;

$$Li_7La_{3-x}Zr_2B_xO_{12} \qquad (2)$$

in formula (2), B is at least one selected from the group consisting of scandium and yttrium, and x is 0.1 or more and 0.6 or less; and
    an abundance ratio of metal atoms each having an ionic radius of 78 pm or more gradually increases from the first area to the second area;
    wherein the solid electrolyte is manufactured by a method that comprises: obtaining a gel by removing a solvent from a precursor solution in which a lithium compound, a lanthanum compound, a zirconium compound, and a compound comprising the metal atoms are dissolved in the solvent; and heat-treating the gel to form a composite containing the first and second areas.

2. The solid electrolyte according to claim 1, wherein a composite containing the first area and the second area has a plurality of voids, a third area which is amorphous is formed in the plurality of voids, and the third area contains an element different from the second area.

3. The solid electrolyte according to claim 1, wherein the metal atoms are any one of niobium, antimony, and tantalum.

4. The solid electrolyte according to claim 2, wherein the third area contains at least lithium, boron, and oxygen as elements.

5. The solid electrolyte according to claim 4, wherein the third area contains lithium borate.

6. A lithium ion battery comprising: a positive electrode; a negative electrode; and a solid electrolyte layer which is sandwiched between the positive electrode and the negative electrode, wherein the solid electrolyte layer contains the solid electrolyte according to claim 1.

7. The solid electrolyte according to claim 1, wherein the solid electrolyte is non-sintered.

8. A solid electrolyte comprising: a first area which has a cubic garnet type crystalline structure; and a second area which is amorphous around the first area, wherein:

each of the first area and the second area contains a complex oxide represented by formula (1) or (2) as a forming material;

$$Li_{7+x}La_{3-x}Zr_2A_xO_{12} \quad (1)$$

in formula (1), A is at least one selected from the group consisting of magnesium, calcium, strontium, and barium, and x is 0.1 or more and 0.6 or less;

$$Li_{7+x}La_{3-x}Zr_2B_xO_{12} \quad (2)$$

in formula (2), B is at least one selected from the group consisting of scandium and yttrium, and x is 0.1 or more and 0.6 or less;

an abundance ratio of metal atoms each having an ionic radius of 78 pm or more gradually increases from the first area to the second area; and the metal atoms comprise antimony;

wherein the solid electrolyte is manufactured by a method that comprises: obtaining a gel by removing a solvent from a precursor solution in which a lithium compound, a lanthanum compound, a zirconium compound, and a compound comprising the metal atoms are dissolved in the solvent; and heat-treating the gel to form a composite containing the first and second areas.

9. The solid electrolyte according to claim 8, wherein the metal atoms further comprise any one of niobium and tantalum.

* * * * *